(12) United States Patent
Guillou

(10) Patent No.: US 9,394,057 B2
(45) Date of Patent: Jul. 19, 2016

(54) SUSPENSION FOR A TURBINE ENGINE
(71) Applicant: SNECMA, Paris (FR)
(72) Inventor: Pierrot Guillou, Paris (FR)
(73) Assignee: SNECMA, Paris (FR)
(*) Notice: Subject to any disclaimer, the term of this patent is extended or adjusted under 35 U.S.C. 154(b) by 24 days.
(21) Appl. No.: 14/577,010
(22) Filed: Dec. 19, 2014
(65) Prior Publication Data
US 2015/0175268 A1 Jun. 25, 2015
(30) Foreign Application Priority Data

Dec. 23, 2013 (FR) ...................................... 13 63488

(51) Int. Cl.
*B64D 27/26* (2006.01)
(52) U.S. Cl.
CPC .......... *B64D 27/26* (2013.01); *B64D 2027/266* (2013.01)
(58) Field of Classification Search
CPC ...................................................... B64D 27/26
USPC ............................................................ 244/54
See application file for complete search history.

(56) References Cited

U.S. PATENT DOCUMENTS

| 4,049,220 | A | * | 9/1977 | Rodgers | F02K 1/36 181/216 |
| 4,560,122 | A | * | 12/1985 | Parkinson | B64D 27/18 244/54 |
| 5,351,930 | A | * | 10/1994 | Gwinn | B64D 27/26 244/54 |
| 5,806,792 | A | * | 9/1998 | Brossier | B64D 27/18 244/54 |
| 6,607,165 | B1 | * | 8/2003 | Manteiga | B64D 27/18 244/54 |
| 7,451,947 | B2 | * | 11/2008 | Machado | B64D 27/12 244/54 |
| 7,963,479 | B2 | * | 6/2011 | Cazals | B64D 27/26 244/54 |
| 2004/0129832 | A1 | * | 7/2004 | Marche | B64D 27/18 244/54 |
| 2005/0178888 | A1 | * | 8/2005 | Machado | B64D 27/26 244/54 |
| 2008/0067286 | A1 | * | 3/2008 | Cousin | B64D 27/12 244/54 |
| 2008/0217467 | A1 | * | 9/2008 | Lafont | B64D 27/18 244/54 |
| 2008/0223983 | A1 | * | 9/2008 | Lafont | B64D 27/18 244/54 |
| 2008/0315033 | A1 | * | 12/2008 | Diochon | B64D 27/18 244/54 |
| 2009/0212155 | A1 | * | 8/2009 | Huggins | B64D 27/26 244/54 |
| 2010/0193627 | A1 | * | 8/2010 | Lafont | B64D 27/18 244/54 |

FOREIGN PATENT DOCUMENTS

| DE | 10 2010 025 488 A | 12/2011 |
| EP | 0 583 158 A1 | 2/1994 |
| FR | 2 323 883 | 4/1977 |

OTHER PUBLICATIONS

French Preliminary Search Report issued Aug. 8, 2014, in French Application No. 13 63488 filed Dec. 23, 2013.

* cited by examiner

*Primary Examiner* — Justin Benedik
(74) *Attorney, Agent, or Firm* — Oblon, McClelland, Maier & Neustadt, L.L.P.

(57) ABSTRACT

A rear suspension for attaching an aeroengine (20) of longitudinal axis X to a carrier structure or mast (12) of an aircraft, the suspension including at least two clevis-forming vertical uprights (26A, 26B; 28A, 28B) supporting a respective horizontal slideway (30A, 30B) having a roller (32) freely mounted thereon that is suitable for moving in a slot (34A, 34B) in a lug (20A) arranged in a YZ plane of transverse axis Y and of vertical axis Z, in such a manner as to enable the aeroengine to move only in translation along the longitudinal axis X and in pivoting about said longitudinal axis X.

10 Claims, 2 Drawing Sheets

SUSPENSION FOR A TURBINE ENGINE

BACKGROUND OF THE INVENTION

The present invention relates to the field of aviation, and more particularly to a suspension for suspending a turbine engine on a pylon or a mast carried by an aircraft.

In conventional manner, aeroengines are contained in nacelles suitable for being arranged at various locations on an aircraft, on or under a wing, or indeed on the rear fuselage, with the connection between the engine and the corresponding structural portion of the aircraft being provided by an attachment system for ensuring that mechanical forces can be transmitted between these two elements along a vertical axis Z due to the weight of the turbine engine and along a transverse axis Y as induced by the movements of the aircraft. The engine is generally suspended from a pylon or a mast at two points that define a front suspension and a rear suspension, with the transmission of thrust forces along the longitudinal axis X taking place via sloping thrust take-up bars that are situated on either side of the engine.

In known manner, the suspension and in particular the rear suspension usually includes at least three outer attachment clevises that are made integrally with the top portion of the exhaust casing of the engine. Those clevises serve to fasten the exhaust casing to the bottom ends of suspension rods having their top ends mounted on a connection beam that is substantially circularly arcuate and fastened by bolts directly under the mast used for supporting the engine. That structure presents dynamics that are complex, which is justified for tracking movements of the engine, but makes it difficult to evaluate the movements of the engine and thus makes it difficult to model them, thereby affecting the dimensioning of the clevises and of the rods, where such dimensioning turns out to be particularly difficult to achieve. It is also not possible to optimize the clearances that exist relative to the mast.

OBJECT AND SUMMARY OF THE INVENTION

The present invention thus proposes a turbine engine suspension that enables nacelle/engine/mast clearances to be reduced and that provides a considerable improvement in its dynamics. Another object of the invention is to provide a suspension that is more compact, while improving the positioning of the engine under the mast, thus making it possible to optimize its aerodynamic performance.

These objects are achieved by a suspension for suspending an aeroengine of longitudinal axis X on a carrier structure or mast of an aircraft, the suspension being characterized in that, on either side of an XZ plane containing said longitudinal axis X, it includes two pairs of vertical uprights with the two uprights in each pair forming a clevis supporting a respective horizontal slideway on which a roller is freely mounted that is suitable for moving in a slot of circularly arcuate shape in a lug arranged in a YZ plane of transverse axis Y and vertical axis Z, so as to enable said aeroengine to move only in translation along said slideway along said longitudinal axis X and in pivoting in said slot about said longitudinal axis X.

Depending on how the attachment is provided, said uprights extend from said mast and said lug is secured to said aeroengine, or vice versa. Thus, by dissociating the movements of the engine into a movement in translation along the engine axis and a movement in pivoting about said axis, the dynamics of the engine are simplified and its movements then become predictable.

Preferably, said slot presents a middle axis M that tracks the circumference of said engine.

Advantageously, said clevis-forming vertical uprights define a predetermined maximum distance for movement in translation of said engine along said longitudinal axis, and said slot defines a predetermined maximum angular range for movement in pivoting of said engine about said longitudinal axis.

Preferably, said predetermined maximum distance for movement in translation of said engine along its longitudinal axis lies in the range 10 millimeters (mm) to 100 mm, and said predetermined maximum angular range for movement in pivoting of said engine about its longitudinal axis is less than 30°.

In a preferred embodiment, the two rear suspension clevises are arranged at a determined angle lying in the range 10° to 90°, and typically in the range 25° to 30° on opposite sides of said longitudinal axis.

Advantageously, said roller is made of stainless steel or of Inconel®.

The invention also provides an aircraft including at least one engine attached to a mast by at least one suspension as specified above.

BRIEF DESCRIPTION OF THE DRAWINGS

Other characteristics and advantages of the invention are described in greater detail on reading the tracking description of embodiments of the invention given with reference to the accompanying drawings, in which.

DETAILED DESCRIPTION OF THE INVENTION

Figure 1:
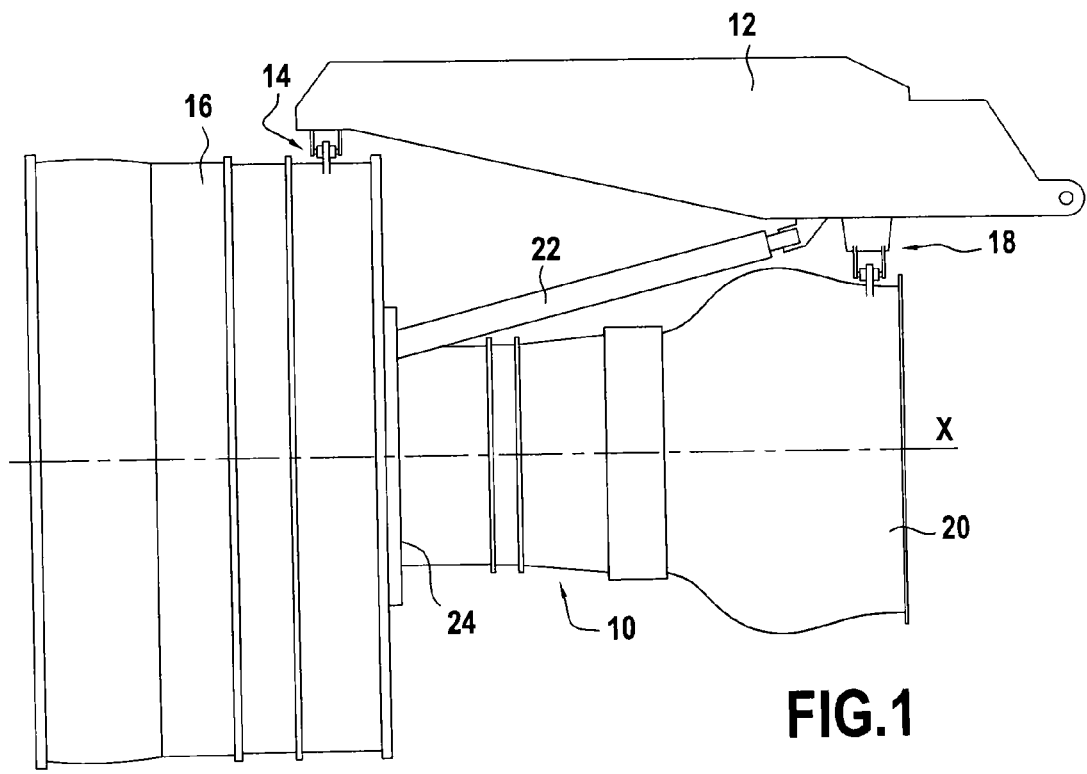
FIG. 1 is a diagrammatic elevation view of an engine attached by suspensions to a mast that is secured to an aircraft.

In FIG. 1, there is shown diagrammatically an engine 10 of longitudinal axis X attached to a pylon or mast 12 that is itself fastened to the aircraft, e.g. under a wing (not shown). The engine is attached to the pylon by two suspensions, a front suspension 14 that connects the front of the pylon to an outer shroud 16 of the fan casing, and a rear suspension 18 that connects the rear of the pylon to the exhaust casing 20, there being two thrust take-up bars 22 extending between these two suspensions, being connected between the pylon and a hub 24 of an intermediate casing arranged inside the fan shroud and supporting the front central portion of the engine.

Figure 2:
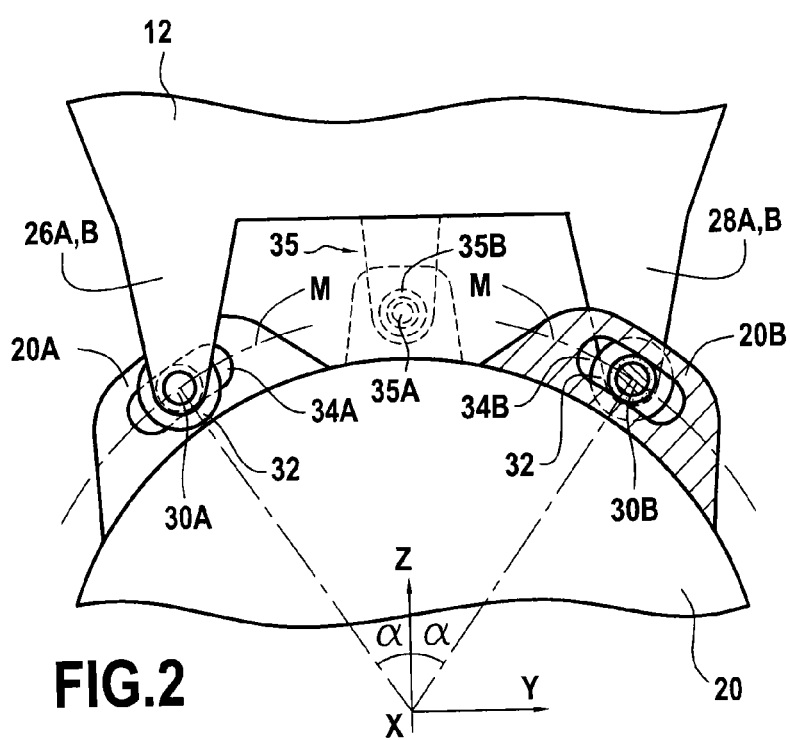
FIG. 2 is a face view of a first embodiment of a suspension in accordance with the invention.
Figure 3:
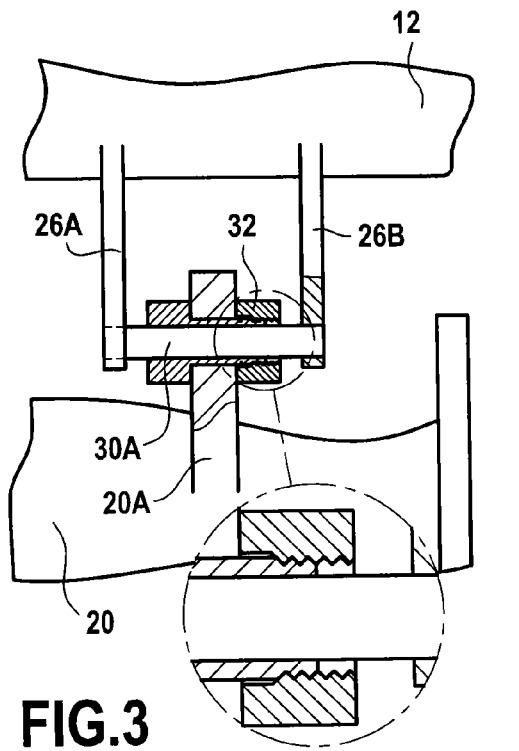
FIG. 3 is a side view of a suspension in accordance with the invention.
Figure 4:
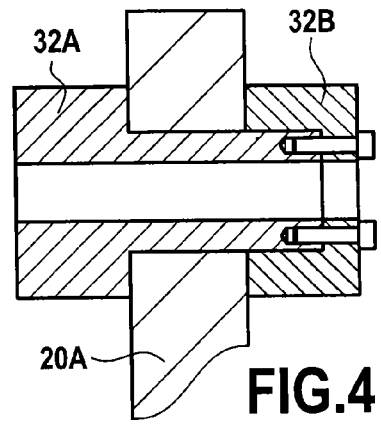
FIG. 4 shows an alternative embodiment for the suspension roller of FIG. 3.

According to the invention and as shown in greater detail in the first embodiment of FIGS. 2 to 4, the suspension 14, 18 has four uprights 26A, 26B; 28A, 28B that are united in pairs and that extend substantially vertically from the pylon 12, the two uprights of each pair forming a clevis being connected together by a respective horizontal slideway or bar 30A, 30B that may be mounted by welding, crimping, or by force, or more simply by screw fastening in the uprights in order to facilitate disassembly, and on which there is freely mounted a roller 32 that can slide on the bar between the uprights that then constitute abutments, while also rolling in a respective oblong slot 34A, 34B in a respective lug 20A, 20B of the exhaust casing 20 of the engine. For safety reasons, an additional so-called "failsafe" fastening 35 between the mast and the engine is generally provided in order to avoid any risk of the engine being lost in the event of breakage. This fastening, which is not under stress in normal operation, is in the known form of a horizontal bar 35A inside a larger hole 35B that leaves clearance in all three directions X, Y, and Z. It should be observed that although the slideway is represented by a smooth shaft of round section, it is clear that any other shape permitting the desired sliding could be envisaged, for example a dovetail section.

Thus, the roller 32 makes it possible simultaneously to track pivoting of the engine 10 about its own longitudinal axis (pivot connection) and sliding of the engine along the pylon 12 (slideway connection), such that the engine is now movable only in a single plane (transverse axis Y vertical axis Z) perpendicular to the longitudinal axis, which is itself movable along this axis X. Nevertheless, it should be observed that depending on the nature of the materials, it is possible to envisage omitting this roller by making the slideway 30A, 30B itself free to move in rotation relative to its two vertical uprights.

In the example shown, the lugs are arranged in the (YZ) plane on either side of the vertical (XZ) plane containing the longitudinal axis X of the engine, each at an angle α lying in the range 10° to 90° (typically about 25° to 30° relative to the vertical plane. There are at least two lugs in order to be able to guide the engine since, with only one lug, there could be a risk of the engine skewing and thus becoming jammed. The slot formed in each lug is in the form of a circular arc having its middle axis M tracking the circumference of the exhaust casing so as to make it possible to take up movements in pivoting of the engine about its longitudinal axis X. Given that the forces and the temperatures involved, the roller that is made of stainless steel or of Inconel® in order to minimize friction during the movements of the engine, is preferably itself made of two portions that are screwed together to make rapid disassembly possible (e.g. with a hollow shaft having a shoulder at one end and a thread at the other end having a nut assembled thereon, as shown in FIG. 3). FIG. 4 shows a variant assembly for the roller comprising a hollow shaft 32A having a shoulder at one end and a spot face at the opposite end assembled with an end plate 32B that is centered and screw fastened. Nevertheless, it is also possible to have an embodiment as a single piece, the shaft and its two abutments forming the roller possibly being enclosed in a jaw plate screwed onto the lug.

Figure 5:
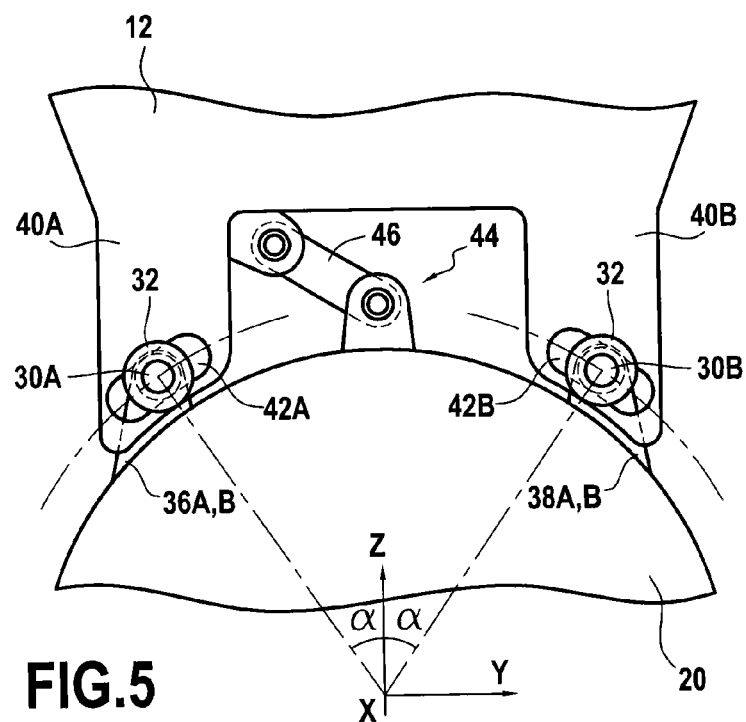
FIG. 5 is a face view of a second embodiment of a suspension in accordance with the invention.

A second embodiment of the invention is shown in FIG. 5, in which the arrangement of the arrangement of the clevis and the lug is inverted.

In this second embodiment, the suspension also has four uprights 36A, 36B; 38A, 38B that are united in pairs, and that extend substantially vertically this time from the casing 20, the two uprights in each pair forming a clevis and being connected together by the respective horizontal bar 30A, 30B having the roller 32 freely mounted thereon as before, which roller can slide on the bar between the uprights that then form abutments, while also rolling in a respective oblong slot 42A, 42B of a respective lug 40A, 40B, this time belonging to the pylon 12 supporting the engine. As in the above described embodiments, a so-called "failsafe" fastening may be provided to avoid any risk of losing the engine in the event of breakage. When the suspension of the invention is used both for the front suspension 14 and for the rear suspension 18, a third fastening 44 is added that then includes a rod 46 for taking up engine torque.

With the invention, the complex dynamics of the prior art is reduced to two movements that are simple; a movement in translation along the longitudinal axis of the engine resulting from the thermal expansion of the hot parts; and a movement in pivoting about this axis due to the effects of air-flow friction and of engine pointing. Thus, the movements of the engine are easier to predict.

The clevis-forming vertical uprights define a predetermined maximum distance for movement in translation of the engine along its longitudinal axis (typically of the order of 30 mm to 100 mm). Specifically, this is to guarantee axial clearance between the clevis and the roller that is greater than the axial thermal expansion of the engine in an axial direction, which expansion depends on the dimensions of the engine, i.e. the larger the engine the more it expands. Furthermore, the higher the temperatures at which the engine is caused to operate, the more it will expand. The slot serves to define a predetermined maximum angular range over which the engine can pivot about its longitudinal axis (less than 30°, and preferably less than 25°). There needs to be clearance of at least 6° for mechanical tolerances when cold. Thereafter, it is necessary to take account of the forces taken up by the stator vanes or engine nozzle of the turbine engine.

The invention claimed is:

1. A suspension for suspending an aeroengine of longitudinal axis X on a carrier structure or mast of an aircraft, wherein on either side of an XZ plane containing said longitudinal axis X, it includes two pairs of vertical uprights with the two uprights in each pair forming a clevis supporting a respective horizontal slideway on which a roller is freely mounted that is suitable for moving in a slot of circularly arcuate shape in a lug arranged in a YZ plane of transverse axis Y and vertical axis Z, so as to enable said aeroengine to move only in translation along said slideway along said longitudinal axis X and in pivoting in said slot about said longitudinal axis X.

2. A suspension according to claim 1, wherein said uprights are suitable for extending from said mast, and wherein in that said lug is suitable for being secured to said aeroengine, or vice versa.

3. A suspension according to claim 1, wherein said slot presents a middle axis M that tracks a circumference of said engine.

4. A suspension according to claim 1, wherein said clevis-forming vertical uprights define a predetermined maximum distance for movement in translation of said engine along said longitudinal axis, and whererin said slot defines a predetermined maximum angular range for movement in pivoting of said engine about said longitudinal axis.

5. A suspension according to claim 4, wherein said predetermined maximum distance for movement in translation of said engine along said longitudinal axis lies in the range 30 mm to 100 mm.

6. A suspension according to claim 4, wherein said predetermined maximum angular range for movement in pivoting of said engine about its longitudinal axis is less than 30°.

7. A suspension according to claim 1, wherein the two clevises are arranged at a determined angle on opposite sides of said longitudinal axis X.

8. A suspension according to claim 7, wherein said determined angle lies in the range 10° to 90° and typically in the range 25° to 30°.

9. A suspension according to claim 1, wherein said roller is made of stainless steel or of a nickel-chromium-based alloy.

10. An aircraft including at least one engine attached to a carrier structure or mast by at least one suspension according to claim 1.

* * * * *